Aug. 11, 1936.    T. T. BAKER    2,050,552
COLOR PHOTOGRAPHY
Filed Aug. 10, 1933
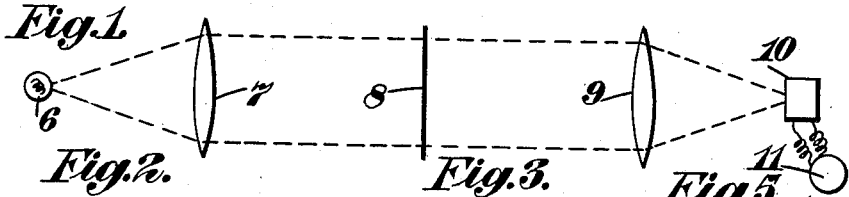
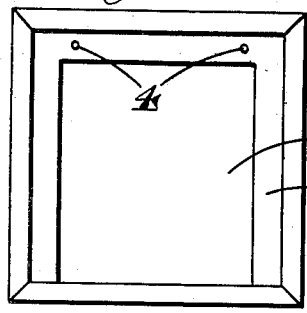
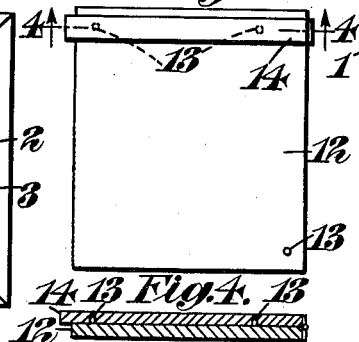
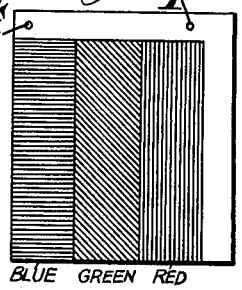
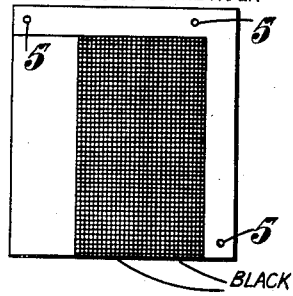
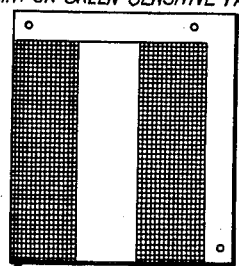
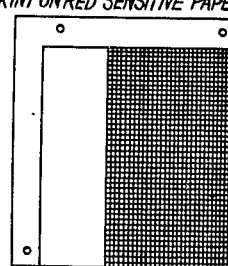
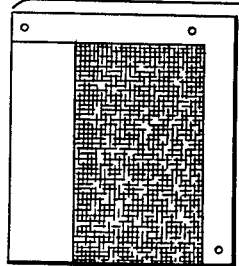
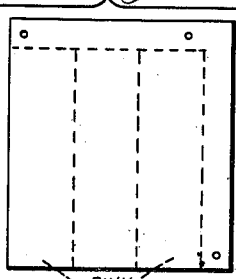
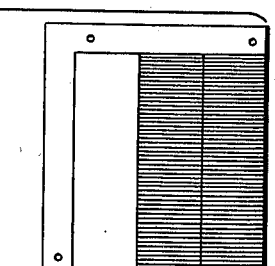
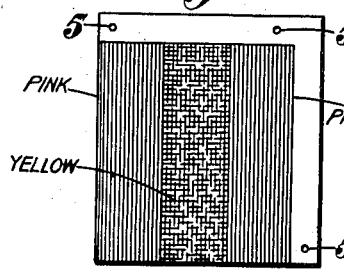
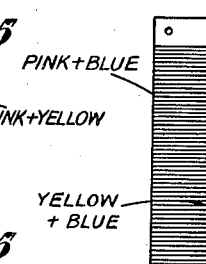
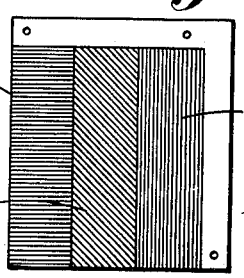
INVENTOR
T. T. Baker
By Watson, Coit, Morse & Grindle
ATTYS.

Patented Aug. 11, 1936

2,050,552

UNITED STATES PATENT OFFICE 2,050,552

COLOR PHOTOGRAPHY

Thomas Thorne Baker, Hatch End, England, assignor to Dufaycolor Limited, London, England, a British company Application August 10, 1933, Serial No. 684,600
In Great Britain August 29, 1932

6 Claims. (Cl. 95—2)

This invention relates to improvements in or relating to color photography.

It has long been possible to produce photographic transparencies in natural colors by means of plates or films carrying a matrix, reseau or color screen of primary colors between the support and the emulsion, exposure taking place through the matrix or color screen after which the image was developed and reversed. Photographic transparencies in natural colors have also been produced by printing on plates or films of the same kind. Typical instances are described in United States Patents Nos. 1,582,126 and 1,805,361.

So far difficulties have been encountered in making color prints (i. e. photographic prints in natural colors to be viewed by reflected light) in an economical manner.

The object of the present invention is to provide a process by which color prints in natural colors on a reflecting base, such as white paper, can be produced easily and at a cost which is entirely practical from a commercial standpoint.

This invention provides the method of producing a composite colored print from a master color-screen record (i. e. a negative or positive transparency) having a plurality of part images of the subject produced by the selective action of the screen colors which comprises preparing from said record a plurality of photographic prints corresponding respectively to the said part images and at least one being on a light reflecting base (e. g. paper) to constitute the base of the final print, rendering this print a color complementary to that primary screen color to which it is appropriate, and making from another (or where there are only two photographic prints the other) of the photographic prints a pigmented gelatine print superposed in register on the print on the light reflecting base and having its part image in a color complementary to the primary screen-color to which it is appropriate.

The master color screen film or plate may be a negative and positive photographic prints may be produced direct but conveniently the master color screen film or plate is a positive and each photographic print produced is reversed to form a positive.

When the invention is applied to a three-color process three photographic prints are made and the partial image on the third print is rendered a color complementary to that of the primary screen color to which it is appropriate and the print is also superposed in register on the print on the paper or like base. This third print may be on a transparent base which forms a protective face for the finished print or it may be separable from its base and this base may be stripped from the print after it has been superposed in register on the print on the paper or like base.

In order that the above method may be easy to carry out in practice it is necessary to ascertain accurately the exposure required to be given for each photographic print in order that the assembled print may have the correct color values, and it is a feature of the present invention that the density of the master color screen record may be measured by means of a beam of light passing through the master record onto a photoelectric cell and the time of exposure necessary for the several photographic prints may be estimated from this density.

In the preferred form of the invention each photographic print is made with light of color containing one of the colors of the screen but containing substantially no component of color transmitted by any of the remaining colors of the screen.

The invention will now be described by way of example with reference to the accompanying drawing, in which:—

Figure 1 is a diagrammatic illustration of the apparatus used for ascertaining the density of the original transparency.

Figure 2 is a back view of the printing frame used in carrying out the invention, with the hinged back removed.

Figure 3 is a plan view of the board upon which the prints are assembled.

Figure 4 is a section along the line 4—4 in Figure 3.

Figure 5 represents a color screen positive transparency arranged emulsion side downwards and having three strips in blue, green and red respectively.

Figure 6 represents three positive photographic prints in black and white produced from the transparency shown in Figure 5 and showing the part images corresponding to the colors of the screen.

Figure 7 represents the three photographic prints after two of them have been toned and showing dotted the latent image formed in a pigmented gelatine layer placed on the other photographic print.

Figure 8 represents the prints after the gelatine layer has been superposed on the first print and developed.

Figure 9 represents the final composite print after the third photographic print has been transferred.

In this example a master natural color positive transparency, illustrated in Figure 5, is prepared in a well-known manner by reversing a negative picture formed on a film having a color screen with small red, green and blue elements. For the sake of clearness the original subject in this case consisted of equal strips colored blue, green and red respectively and the transparency shown in Figure 5 appears in these colors when viewed by transmitted light. Two holes 1 are punched through the film each symmetrically placed near a top corner. These holes are carefully spaced apart and are, conveniently, punched simultaneously with a double punch. The transparency is then placed in the printing frame shown in Figure 2 which has a hinged back of the well-known type. The front of the frame consists of a piece of glass 2 and a flat border 3 of wood of the same thickness as the glass. This border carries two ivory pins 4 which engage with the holes 1 in the transparency and accurately hold it in position.

Three pieces of bromide paper, one sensitive to blue, one sensitive to green and one to red light and all on paper having the same expansion on wetting are punched, using a triple punch, with three holes 5 in Figure 6 each near a corner and the two at the top adapted to be closely engaged by the pins 4 in the printing frame. These pieces of paper are each, in turn, placed in the printing frame and exposure through the original transparency is made using light of color corresponding to the color of the screen to which the emulsion is sensitive thus forming, after development and reversal, three photographic prints as shown in Figure 6 each of which is a black and white record of one of the part images formed on the original transparency by the colors of the screen.

The prints on blue and green sensitive paper are each made with the emulsion in contact with the emulsion of the master transparency and since the transparency is shown in Figure 5 emulsion side downwards the images appear in Figure 6 in corresponding positions on these two prints. The print on red sensitive paper however is made with the master transparency turned over in the frame and the print is therefore made, and shown, in reversed position from left to right. This is necessary in order that when assembled all the partial prints may be in register.

In order to obtain sufficient speed in the negative film it is necessary to provide the color screen with the colors having slightly overlapping wave-lengths. The bromide prints should, however, for true color rendering each be a separation record of only that portion of the negative associated with the elements of one of the colors of the screen, and it is therefore necessary to use in printing light which will be transmitted by those color elements but which does not contain any component that will be transmitted by the elements of any of the other colors of the screen.

The time of exposure necessary for the photographic prints is determined by means of the apparatus shown diagrammatically in Figure 1. A beam of light of standard intensity is passed from a lamp 6 through a lens system 7 giving a parallel beam which passes through the transparency 8 to a second lens system 9 which converges the beam onto a photo-electric cell 10 connected to a galvanometer 11. The reading on the galvanometer corresponds to the density of the transparency and the time of exposure for each print corresponding to this reading may then be read off a graph which has been prepared from experiments, or the galvanometer may be calibrated to give the times direct. The ratios of the times of exposure for the three prints depend on the ratios of the colors in the screen, on the sensitivity of the papers and on the exposure and development conditions. In one case the time of exposure for the print on blue sensitive paper when divided by two for the print on green sensitive paper and four for the print on red sensitive paper gave satisfactory results.

The prints are then developed and reversed to form positives. The development conditions should be chosen to give the characteristic curves and gammas of the prints as nearly the same as possible.

The photographic print on blue sensitive paper is next toned yellow as indicated in Figure 7 and forms the common base upon which the picture is combined.

A suitable method of toning the print is to bleach it in a solution of lead acetate and potassium ferricyanide and then to convert with potassium bichromate or chromate to a yellow image of lead chromate.

The print on green sensitive bromide paper after soaking in water for sufficient time to ensure the maximum stretch (which may amount to 1 or 2 m. m. in the length of a half-plate print on ordinary paper) is next placed face upwards on a registering board. This registering board is shown in Figures 3 and 4 and consists of a base 12 of flat wood which has three ivory pins 13 adapted to engage closely the holes in paper after it has been wetted. A presser bar 14 fitting over two of the pins is also provided for holding the prints in position.

A pink elemental print is next made from the photographic print on green sensitive bromide paper using pink pigmented gelatine on a paper backing. This pigment paper, which is well-known in itself, is preferably on a backing of the same paper as was used for the bromide prints in order to obtain the same stretch on wetting, is punched (while dry) with the above-mentioned triple punch. The paper is thoroughly wetted and is then sensitized in the known manner and placed face downwards onto the "green" print on the registering board with the holes in the wet paper in engagement with the pins. The two papers are squeegeed together and allowed to react together, under a weight, for four and a half minutes. The print on green sensitive paper is shown in Figure 7 with the pink pigment paper superposed and the pink patent image dotted. The papers are then removed from the board together and separated. Any surplus sensitizer is then removed from the pigment by two washings of one minute each in water and one in equal quantities of methylated spirits and water.

The print on blue sensitive paper, now toned yellow, which has been left wet or resoaked is now placed face upwards on the registering board and the pink elemental print (still in position on its backing and not yet developed) is placed in contact therewith. Registration is effected solely by means of the pins on the board engaging with the holes in the respective prints. The two prints are squeegeed together and allowed to rest for ten minutes under a weight. They are then placed in water at 103° F. to develop the pink print and the backing is stripped from that print. There is left at this stage therefore a yellow elemental print and a pink elemental print permanently superposed thereon as is shown diagrammatically in Figure 8.

The bromide paper used for the third photographic print (i. e. that sensitive to red light) is made on a known type of paper in which a thin layer of readily soluble gelatine is placed between the emulsion and the paper backing. The image in this case is toned blue to form the third elemental print as is also shown diagrammatically in Figure 8.

The above combined yellow and pink print is next placed face upwards and still wet on the registering board and the wet blue print placed face downwards thereon and squeegeed. Registration in the case also is obtained by means of the pins on the board engaging with the holes in the respective prints (the holes in the third print being arranged to engage with the pins when the print is face downwards). The combined prints are next placed in warm water (130° F.) to dissolve the above gelatine layer and the backing stripped from the blue print leaving the three elemental prints in register on a common base, and forming a picture in color, as is shown diagrammatically in Figure 9.

When it is desired to prepare a number of composite colored prints from one positive transparency it may be preferred to prepare negatives of the part images on color sensitive films using the requisite separation filters. The ordinary black and white photographic prints on bromide or like paper may then be produced from these negatives in the usual way.

I claim:—

1. A process of producing a multicolor print from a multicolor transparency, comprising perforating said transparency outside of the image area, producing therefrom three images, each representing one of the primary colors of said transparency, on paper supports having substantially the same stretch and having perforations which, when said paper supports are dry, coincide exactly with the perforations of said transparency, said images being positioned with respect to said perforations in the same manner as is the image of said transparency with respect to the perforations thereof, maintaining said paper supports in a wet condition for a period of time sufficient to insure maximum stretching and, the supports being in wet, stretched condition, successively superimposing two of said images in register upon the third and removing the backings from said two images, registration being made by means of said perforations, whereby a multicolor print is produced.

2. A process of producing a multicolor print from a multicolor transparency, comprising perforating said transparency outside of the image area, producing therefrom three images, each representing one of the primary colors of said transparency, on paper supports having substantially the same stretch and having perforations which, when said paper supports are dry, coincide exactly with the perforations of said transparency, said images being positioned with respect to said perforations in the same manner as is the image of said transparency with respect to the perforations thereof, one of said images being undeveloped, maintaining said paper supports in a wet condition for a period of time sufficient to insure maximum stretching, superimposing said undeveloped image in register upon one of said other images while in wet, stretched condition, developing said undeveloped image and removing the backing therefrom, superimposing the third image in register upon the first two, the supports being in wet, stretched condition and removing the backing from said third image, registration being made by means of said perforations, whereby a multicolor print is produced.

3. A process of producing a multicolor print from a multicolor transparency, comprising perforating said transparency outside of the image area, perforating similarly three sensitized papers having substantially the same stretch, exposing each of said papers to said transparency while maintaining said paper in register with said transparency by means of said perforations, processing said paper prints to produce images, said processing including maintaining said prints in a wet condition for a period of time sufficient to insure maximum stretching of their paper supports, similarly perforating a further paper provided with a pigmented coating, said paper backing having substantially the same stretch as said first papers, wetting said pigmented paper so as to insure maximum stretch, exposing said pigmented paper to one of said prints while in a wet, stretched condition, and while maintaining said paper and said print in register by means of said perforations, superimposing the latent image thus produced, on said pigment paper, in register upon one of the two remaining prints while in wet, stretched condition, developing said latent image and removing the backing therefrom, superimposing the image of the third print in register upon the first two while the paper supports are in a wet, stretched condition, and removing the backing from said third image, registration being made by means of said perforations, whereby a multicolor print is produced.

4. A process of producing a multicolor print from a positive multicolor transparency, comprising perforating said transparency outside of the image area, perforating similarly three sensitized papers having substantially the same stretch, exposing each of said papers to said transparency while maintaining said paper in register with said transparency by means of said perforations, processing said paper prints to produce images, said processing including maintaining said prints in a wet condition for a period of time sufficient to insure maximum stretching of their paper supports, reversing said prints, similarly perforating a further paper provided with a pigmented coating, said paper backing having substantially the same stretch as said first papers, wetting said pigmented paper so as to insure maximum stretch, exposing said pigmented paper to one of said prints while in a wet, stretched condition, and while maintaining said paper and said print in register by means of said perforations, superimposing the latent image thus produced, on said pigment paper, in register upon one of the two remaining prints while in wet, stretched condition, developing said latent image and removing the backing therefrom, superimposing the image of the third print in register upon the first two while the paper supports are in a wet, stretched condition, and removing the backing from said third image, registration being made by means of said perforations, whereby a multicolor print is produced.

5. A process of producing a multicolor print from a multicolor transparency, comprising perforating said transparency outside of the image area, perforating similarly three films suitable for making separation negatives, making a separation negative corresponding to one of the primary colors of said transparency on each of said films while maintaining said film in register with said transparency by means of said perforations, perforating similarly three sensitive papers having substantially the same stretch, exposing the papers each to one of the separation negatives while maintaining the paper and negative in registration by means of said perforations, processing the paper prints to produce differently colored images, said processing including maintaining the paper supports in a wet condition for a period of time sufficient to insure maximum stretching, superimposing two of the images in register while in wet, stretched condition, removing the paper backing from one of them, superimposing the third image upon the other two, the supports being in wet, stretched condition, and removing the backing of said third image, registration being made by means of said perforations.

6. A process of producing a multicolor print from a multicolor transparency, comprising measuring the density of said transparency, perforating said transparency outside of the image area, perforating similarly three films suitable for making separation negatives, making a separation negative corresponding to one of the primary colors of said transparency on each of said films while maintaining said film in register with said transparency by means of said perforations, the exposure of each said film being controlled in accordance with the density of said transparency, perforating similarly three sensitive papers having substantially the same stretch, exposing the papers each to one of the separation negatives while maintaining the paper and negative in registration by means of said perforations, processing the paper prints to produce differently colored images, said processing including maintaining the paper supports in a wet condition for a period of time sufficient to insure maximum stretching, superimposing two of the images in register while in wet, stretched condition, removing the paper backing from one of them, superimposing the third image upon the other two, the supports being in wet, stretched condition, and removing the backing of said third image, registration being made by means of said perforations.

THOMAS THORNE BAKER.